United States Patent [19]

Elmer

[11] 4,285,756
[45] Aug. 25, 1981

[54] ADHESION OF POLYAMIDE OR POLYESTER CORDS TO EPDM RUBBER

[75] Inventor: Otto C. Elmer, Akron, Ohio

[73] Assignee: The General Tire & Rubber Company, Akron, Ohio

[21] Appl. No.: 166,633

[22] Filed: Jul. 7, 1980

[51] Int. Cl.$^3$ .................. B29H 9/00; C08L 61/12
[52] U.S. Cl. ........................ 156/334; 156/110 A; 260/29.3; 260/38; 525/133; 525/139
[58] Field of Search .............. 260/29.3 R, 38; 525/133, 139; 156/334; 427/379

[56] References Cited

U.S. PATENT DOCUMENTS

| | | | |
|---|---|---|---|
| 3,300,426 | 1/1967 | Hunsucker | 260/29.3 |
| 3,578,613 | 5/1971 | Tai | 260/3 |
| 3,787,224 | 1/1974 | Uffner | 117/72 |
| 3,855,168 | 12/1974 | Ozeki et al. | 260/29.3 |
| 3,888,813 | 6/1975 | Moult et al. | 269/29.3 |
| 4,197,228 | 4/1980 | Lin et al. | 260/28.5 B |

Primary Examiner—Theodore E. Pertilla

[57] ABSTRACT

An aqueous alkaline dispersion of a rubbery polybutadiene and a water soluble, heat reactive phenolic resin is useful in forming an adhesive for bonding polyamide or polyester reinforcing elements or cords to ethylene-propylene-diene rubbery polymer (EPDM) compounds or stocks. After dipping the polyamide or polyester cord in the adhesive dip, the coated cord is heated to dry it and heat cure or heat set the adhesive on the cord. Thereafter, the adhesive containing polyamide or polyester cord is combined with, or laminated to (calendered), a curable or vulcanizable EPDM compound and the resulting assembly is cured to form a composite in which the polymide or polyester cord is bonded to the EPDM rubber by means of said adhesive.

12 Claims, No Drawings

ADHESION OF POLYAMIDE OR POLYESTER CORDS TO EPDM RUBBER

This invention relates to the adhesion of polyamide or polyester cords to EPDM rubber using an adhesive composition of a rubbery polybutadiene and a phenolic-aldehyde resin.

OBJECTS

An object of the invention is to provide a composite of a polyamide or polyester reinforcing element adhesively bonded to an EPDM rubber compound. Another object is to provide a method for bonding polyamide and/or polyester reinforcing elements, particularly polyamide and polyester textiles, fibers, cords, yarns and so forth, to EPDM rubber compounds. These and other objects and advantages of the present invention will become more apparent to those skilled in the art from the following detailed description and working example.

SUMMARY OF THE INVENTION

According to the present invention it has been discovered that a composition comprising an aqueous alkaline dispersion of a rubbery polybutadiene, and a heat reactable water soluble phenolic-aldehyde resin, in certain amounts, is very useful as a treating, dipping or coating material for use in bonding polyamide or polyester reinforcing elements to EPDM rubber compounds (compositions). Sufficient alkaline material such as aqueous $NH_3$, KOH or NaOH may be added to the dispersion (or to one or more of the ingredients of the dispersion before mixing them together) to obtain the desired pH, prevent coagulation of the latex and to provide for stabilization. This will vary with the pH of the resin and the latex, all of which may vary from batch to batch. Since the amount of each compound may vary, the amount of alkaline material required can also vary. After drying the adhesive on the polyamide or polyester reinforcing element to remove water and to heat cure or heat set the adhesive on the element, the adhesive containing element can then be combined or calendered with a curable EPDM rubber compound and the resulting assembly cured, usually in a mold, to provide a laminate exhibiting good adhesive properties.

The use of the rubbery polybutadiene based latex adhesive enables the obtainment of high H-adhesions, higher than adhesives using vinyl pyridine copolymers, and in many cases higher than adhesives using chlorosulfonated polyethylene.

DISCUSSION OF DETAILS AND PREFERRED EMBODIMENTS

The polyamide, or nylon, reinforcing element of the present invention may be an aromatic polyamide, an aliphatic polyamide, or a polyamide containing both aliphatic and aromatic units. These long chain polymeric amides are capable of being formed into filaments and have recurring amide groups as an integral part of the main polymer chain. The polyamide ingredient can be a homopolymer, block or random copolymer, or a mixture of two or more of such polymers. The polyamide will usually have both crystalline and amorphous regions. Groups other than amide, respectively, may be present in minor amounts in these polymers, such groups including: carbonate, urea, urethane, ether, ketone, imidazole, oxazole, and other oxygen-containing moieties.

In general, these high molecular weight polyamides are obtained by reacting polyamines, such as the alpha, omega-diamines, like 1,6-hexamethylene diamine, 1,5-pentamethylene diamine and 1,8-octamethylene diamine, with polycarboxylic acids, such as adipic acid, succinic acid, phthalic acid, chlorophthalic acid and the like. The polyamides may also be prepared by polymerization of aminocarboxylic acids, such as aminocaproic acid. Polyamides from caprolactam and p-amino-benzoic acid, also, can be used.

The high molecular weight aromatic or substantially aromatic polyamides are preferred and are obtained by condensation of metaphenylene diamines with isophthalic acid or paraphenylene diamines with terephthalic acids or m, p, or o-benzamides or mixtures of the above isomeric amines with isomeric acids. It is also possible to make polyamides using the above mentioned isomers with substitutes on the phenyl groups, halogen (—Cl), alkyl ($CH_3$—), etc., or to use biphenyl acids with diamines or aromatic diamines and/or diacids in which the aromatic nuclei are spaced by:

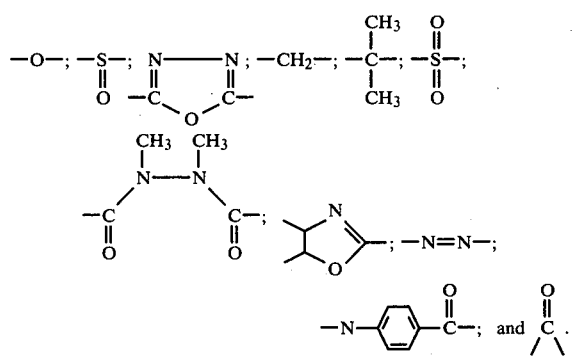

Instead of phenylene groups, the polymers can partly or totally contain heterocyclic rings.

Examples of such materials are polyhexamethylene adipamide, copolymers of metaphenylene diamine and terephthalic or isophthalic acid or acid chloride, poly[-bis-(4-amino-cyclohexyl)methanedodecamide],poly-para-phenylene terephthalamide from phenylene-diamine and terephthaloyl chloride, poly(hexamethylene terephthalamide), poly-m, or p-benzamide and the like. Examples of commercially available aliphatic polyamides are nylon 6 and nylon 66. Examples of aromatic polyamides are "Nomex," "Fiber B" and "Kevlar" (the "aromids" or "aramids").

More preferred are the linear or long chain synthetic aromatic polyamides in which at least 85% of the amide linkages are attached directly to aromatic rings, which are highly crystalline, and which have a modulus (grams/denier) of at least about 350 like "Kevlar."

Polyamides and methods for making them are well known as shown by U.S. Pat. Nos. 2,071,250; 2,071,253; 2,130,948; 2,241,321; 3,006,899; 3,094,511; 3,225,011; 3,232,910; 3,308,007; 3,464,878; 3,536,651; 3,629,053; 3,632,548; 3,660,361; and 3,673,143; Belgian Pat. No. 726,050; French Pat. No. 1,526,745; British Pat. No. 1,259,788; "Mechanics of Pneumatic Tires," Clark, National Bureau of Standards Monograph 122, U.S. Department of Commerce, issue November, 1971, pages 225 to 238; and "Rubber World," April, 1972, page 56.

More information on polyamides, especially those for use in making fibers, can be found in "Encyclopedia of Polymer Science and Technology," Interscience Publishers division of John Wiley and Sons, Inc., New York, 1969, Volume 10, pages 347 to 460 and, more particularly with respect to high modulus fibers, in "Chem Tech," Preston, November, 1971, pages 664 to 671; "American Chem. Soc. Polym. Prepr.," Bach et al, 11(1), 334 (1970); "Journal of Polymer Science," Frazer et al, Part A, Volume 2, pages 1147 to 1169 (1964); and the "Federal Register," Volume 37, No. 120, June 21, 1972, pages 12243 and 12244. See, also, U.S. Pat. Nos. 3,872,937 and 3,888,805 and "Rubber & Plastics News," Mar. 19, 1979, pages 44 to 49.

The polyester reinforcing elements of the present invention are linear high molecular polyesters usually made by the condensation of $\alpha,w$-glycols and dicarboxylic acids. These polyester fibers and the like may be oriented and can have number average molecular weights up to about 60,000 and melting points up to about 300 degrees C. Preferably, these polyesters exhibit substantial crystallinity, up to as much as about 50%, usually 38 to 45%, high strength and high tenacity. Also, preferred, are the polyesters in which the fiber is composed of at least 80% by weight of an ester of a dihydric alcohol and terephthalic acid such as poly-(ethylene terephthalate). Examples of such polyesters are the high molecular weight polymers obtained from aliphatic glycols and the aromatic dicarboxylic acids, e.g., the high molecular weight condensation product obtained from ethylene glycol and terephthalic acid known as polyethylene terephthalate. Other polyesters which may be used are poly(ethylene oxybenzoate); polypivalalactone; terpolymers from dimethyl phthalate, dimethyl isophthalate and ethylene glycol; polyesters having at least two different repeating units from ethylene terephthalate, p-trimethylene oxybenzoate, and ethylene-1,4-diphenoxy butane-4,4'-dicarboxylate; poly(ethylene terephthalate-isophthalate); poly(1,4-cyclohexylenedimethylene terephthalate); and the like and mixtures thereof. Suitable polyester reinforcing elements are commercially available under the trademarks "Dacron" (duPont), "Encron" (American Enka Corporation) and "Vycron" (Beaunit Corporation). These high molecular weight linear polyesters are well known and can be made by methods known to the art. For example, the preparation of polyesters is shown by U.S. Pat. Nos. 2,465,319; 2,965,613 and 2,901,466. See, also, U.S. Pat. No. 3,861,980. Other references disclosing the preparation of polyesters useful for making filaments, fibers, cords and so forth and which can be used to make various products are:

(A) "Encyclopedia of Polymer Science And Technology," Volume 11, 1969, Interscience Publishers a division of John Wiley & Sons, Inc., New York, pages 1 to 41;
(B) "Encyclopedia of Chemical Technology," Kirk-Othmer, Second Edition, Volume 16, 1968, Interscience Publishers a division of John Wiley & Sons, Inc., New York, pages 143 to 159; and
(C) "Polyesters," Korshak et al, 1965, Pergamon Press Inc., New York, N.Y., pages 384 to 415.

The polyamide or polyester reinforcing elements may be in the form of fibers, continuous filaments, staple, tow, yarns, cord, fabric and so forth. While mixtures of polyamide and polyester fibers may be used, it is preferred to use one type of polymer. These polyamide or polyester elements may contain finishes or lubricants or be preactivated or primed, e.g., with urethane and/or epoxy groups.

The curable or vulcanizable EPDM polymers (ethylene-propylene-diene monomer rubbery or elastomeric co- or terpolymers) are well known. The diene used in the EPDM polymer is usually a non-conjugated diene such as any one or more of those generally known to the art but preferably is 1,4-hexadiene, ethylidene norbornene or dicyclopentadiene. Very minor amounts of other copolymerized monomers such as hexene, butene and so forth may be present so long as they do not adversely affect the properties of the EPDM, and the diene comonomer can comprise a mixture of dienes as is well known to those skilled in the art. Blends of EPDM terpolymers can be used. Rubbery or elastomeric EPDM terpolymers, methods for making them and methods for curing them are known as shown by "Rubber Chemistry And Technology," Volume 45, No. 1, March, 1972, Division of Rubber Chemistry, Inc., American Chemical Society, pages 709 to 881; "Rubber Technology," 2nd Ed., Morton, Van Nostrand Reinhold Company, New York, 1973, Chapter 9; "Polymer Chemistry of Synthetic Elastomers," Part II, High Polymer Series, Vol. 23, John Wiley & Sons, Inc., New York, 1969, Chapter 7; "Encyclopedia Of Polymer Science And Technology," Interscience Publishers, a division of John Wiley & Sons, Inc., New York, Vol. 6 (1967) pages 367 to 380 and Vol. 5 (1966) page 414; "Encyclopedia Of Chemical Technology," Kirk-Othmer, Interscience Publishers Div. of John Wiley & Sons, Inc., New York, Vol. 17, 2nd Ed. (1965), pages 575 to 576 and Vol. 7, 2nd Ed. (1965), pages 686 to 693; "The Synthetic Rubber Manual," International Institute of Synthetic Rubber Producers, Inc., 8th Edition, 1980; and "Types Of Nordel Hydrocarbon Rubber," Bedwell, pamphlet NOR-101, 1974, E. I. du Pont de Nemours and Company, Wilmington, Del.

The water soluble thermosetting (heat reactable) phenolic-aldehyde resin is made by reacting an aldehyde with a phenolic compound. An excess (over stoichiometry) of the aldehyde is reacted with the phenolic compound. The preferred aldehyde to use is formaldehyde, but acetaldehyde and furfural, also, may be used. In place of formaldehyde one may use paraformaldehyde, the dry powder form of formaldehyde. Also, it is preferred to start with formalin, usually a 37% solution of formaldehyde in water, which is easier to use. Mixtures of aldehydes can be used. The phenolic compound can be phenol itself, resorcinol, the cresols, the xylenols, p-tert butylphenol or p-phenyl phenol or mixture thereof. Preferably, the reactants are formaldehyde and resorcinol which are reacted in water usually in the presence of an alkaline catalyst or an alkaline material is added before use. Information on the preparation of the water soluble thermosetting phenolic-aldehyde resins will be found in "Encyclopedia of Chemical Technology," Kirk-Othmer, Volume 15, Second Edition, 1968, Interscience Publishers Division of John Wiley & Sons, Inc., New York, pages 176 to 208; "Technology of Adhesives," Delmonte, Reinhold Publishing Corp., New York, N.Y., 1947, pages 22 to 52; "Formaldehyde," Walker, A.C.S. Monograph Series, Reinhold Publishing Corp., New York, N.Y., Third Edition, 1964, pages 304 to 344 and "The Chemistry of Phenolic Resins," Martin, John Wiley & Sons, Inc., New York, 1956.

The rubbery polybutadiene may be made in water using free radical catalysts, chelating agents, modifiers, emulsifiers, surfactants, stabilizers, short stopping agents and so forth to form a latex. The butadiene-1,3 may be hot or cold polymerized, and polymerization may or may not be carried to about 100% conversation. If polymerizations are carried out with appropriate amounts of chain transfer agents or modifiers, low or no gel polymers are possible. See U.S. Pat. No. 4,145,494. Free radical aqueous emulsion polymerization is well known as shown by:

(1) Whitby et al, "Synthetic Rubber," John Wiley & Sons, Inc., New York, 1954;
(2) Schildknecht, "Vinyl and Related Polymers," John Wiley & Sons, Inc., New York, 1952;
(3) "Encyclopedia of Polymer Science and Technology," Interscience Publishers, a division of John Wiley & Sons, Inc., New York, Vol. 2 (1965), Vol. 3 (1965), Vol. 5 (1966), Vol. 7 (1967) and Vol. 9 (1968); and
(4) "Materials, Compounding Ingredients and Machinery for Rubber," Publ. by "Rubber World," Bill Communications Inc., New York, 1977.

The solids content of the latex as produced may vary from about 25 to 50% by weight. Rubbery polybutadienes, also, may be made by anionic solution polymerization and may be mixed with water, soap, stabilizers and so forth, and the solvent stripped from the mixture to form an emulsion or latex.

The water soluble thermosetting phenolic-aldehyde resin and the rubbery polybutadiene are present together in the aqueous adhesive dispersion in an amount of from about 10 to 35% by weight solids (dry basis). The ratio of the phenolic-aldehyde resin to the rubbery polybutadiene on a dry weight basis generally is from about 10:100 to 40:100 parts by weight, preferably from about 12:100 to 30:100 parts by weight.

The pH of the dip should be on the alkaline side and the pH of any surfactants and stabilizers, including freeze-thaw stabilizers and other additives, should be on the alkaline side or compatible or be neutral to avoid improper coagulation of the latex(es).

Water is used in an amount sufficient to provide for the desired dispersion of the rubber or latex particles, and for the solution of the phenolic resin and any other additives, to obtain the desired viscosities, and for the proper solids content to get the necessary pickup of solids on and penetration between the fibers of the cord. The amount of water in the cord dip generally may vary as desired. However, too much water may require redipping or use of excess heat to evaporate the water on drying. Too little water may cause uneven coating or too slow coating speeds.

To apply the latex adhesive to the polyamide or polyester cords in a reliable manner, the cords are fed through the adhesive dip bath while being maintained under a small predetermined tension and into a drying oven where they are dried under a small predetermined tension. Slight stretching may be used where desired. As the cords leave the oven they enter a cooling zone where they are air cooled before the tension is released. In each case the adhesive-coated cords leaving the dip are dried in the oven at from about 300 to 525 degrees F. (148.9 to 274 degrees C.) for from about 150 to 25 seconds.

The time the cord remains in the adhesive is about a few seconds or more or at least for a period of time sufficient to at least allow wetting of the cord and at least some impregnation of the surface fibers of the cord. The dipping of the cords and the drying or curing of the adhesive treated polyamide or polyester cords may be accomplished in one or more dip tanks and in one or more ovens at different times and temperatures.

The single-cord H-pull, H-adhesion, test is employed to determine the static adhesion of the dried (heat set or cured) adhesive coated polyamide or polyester cords to the EPDM rubber. In each case the EPDM rubber test specimens are made from an EPDM vulcanizable rubber composition comprising the EPDM rubber, reinforcing carbon black and the customary compounding and curing ingredients. In every case the cords to be tested are placed in parallel positions in a multiple-strand mold of the type described in the single-cord H-pull adhesion test ASTM designated D 2138-67, the mold is filled with the unvulcanized EPDM rubber composition, the cords being maintained under a tension of 50 grams each, and the EPDM rubber composition is cured for a time and at a temperature sufficient to bring it to the elastic state. Each EPDM rubber test specimen is ¼ inch thick and has a ⅜ inch cord embedment. After the EPDM rubber has been cured, the hot cured rubber piece is removed from the mold, cooled and H-test specimens are cut from said piece, each specimen consisting of a single cord encased in rubber and having each end embedded in the center of a rubber tab or embedment having a length of around 1 inch or so. The specimens are then aged at least 16 hours at room temperature (about 25 degrees C.) before testing them.

The force required to separate the cord from the EPDM rubber is then determined at room temperature using an INSTRON tester provided with specimen grips. The maximum force in pounds required to separate the cord from the rubber is the H-adhesion value. All the data submitted in the working example which follows are based upon identical test conditions, and all of the test specimens were prepared and tested in the same way generally in accordance with ASTM Designation: D 2138-67.

Polyamide or polyester cords or fabric coated with the adhesive of the present invention can have from about 3 to 17%, preferably from about 3 to 7%, by weight (dry) solids of the adhesive dip on the cord based on the weight of the cord and can be used in the manufacture of transmission belts, V-belts, conveyor belts, hose, gaskets, tarpaulins and the like of EPDM rubbery polymers.

The EPDM rubbers can be mixed with the usual compounding ingredients including sulfur, stearic acid, zinc oxide, rubber extending and processing oils, zinc stearate, magnesium oxide, silica, carbon black, clay, accelerators and other curatives, rubber compounding ingredients and the like well known to those skilled in the art for EPDM rubbers. If desired, antioxidants and antidegradants may be added.

The following example will serve to illustrate the present invention with more particularity to those skilled in the art. In the example the parts are parts by weight unless otherwise indicated.

EXAMPLE

The polyester cord used was duPont T-68 polyethylene terephthalate 1300/3 tire cord. It was first primed with the following composition:

| Ingredient | Parts by Weight | |
|---|---|---|
| | Dry | Wet |
| "Hylene" MP (40% | 3.60 | 9.00 |

-continued

| | Parts By Weight | Parts By Weight |
|---|---|---|
| dispersion in water) | | |
| "Epon" 812 | 1.36 | 1.36 |
| Gum Tragacanth | 0.04 | 2.00 |
| (2% in water) | | |
| Soft water | — | 87.64 |

Total solids content (TSC) = 5% by weight (bw)

40% Hylene MP Dispersion:

| | Parts By Weight | |
|---|---|---|
| Ingredient | Dry | Wet |
| "Hylene" MP | 38.72 | 38.72 |
| "Aerosol" OT | 1.28 | 1.28 |
| Soft Water | — | 60.00 |

After dipping the polyester cord in the above isocyanate-epoxide primer dip, the primed polyester cord was heated in an oven for 60 seconds at 450 degrees F. (232 degrees C.) to dry the cord and set the primer.

The polyamide cord used was duPont "Kevlar" aramid 1500/3 tire cord (polyparaphenylene terephthalamide). It was first primed with the following composition:

| Ingredient | Parts By Weight |
|---|---|
| Soft Water | 698 |
| Aerosol OT (5% in water) | 4 |
| NER-OIOA Epoxide | 16 |
| NaOH (10% in water) | 2 |

After dipping the polyamide cord in the above epoxide primer dip, the primed polyamide cord was treated in an oven for 60 seconds at 475 degrees F. (246 degrees C.) to dry the cord and set the primer.

Butadiene was polymerized in closed stirred reactors under nitrogen for 24 hours at 150 degrees F. (65.6 degrees C.) according to the formulations as shown in Table 1 below:

TABLE 1

Rubbery Polybutadiene Latices

| | Parts by Weight | | |
|---|---|---|---|
| Ingredient | A | B | C |
| Butadiene | 100 | 100 | 100 |
| $K_2S_2O_8$ | 0.6 | 0.6 | 0.6 |
| "Sulfole" 120 | 0.5 | 0.5 | 0.5 |
| $K_2CO_3$ | 0.3 | 0.3 | 0.3 |
| $H_2O$, deionized | 200 | 200 | 200 |
| "Sipex" UB (30% in water) | 15 | — | — |
| "Dowfax" 2Al (45% in water) | — | 11.25 | — |
| "Dresinate" 214 (20% in water) | — | — | 22.5 |
| Viscosity, cps | 51 | 39 | 70 |
| TSC % b.w. | 31.1 | 33.2 | 32.3 |

| Ingredient | D | E | F | G | H | I |
|---|---|---|---|---|---|---|
| Butadiene | 100 | 100 | 100 | 100 | 100 | 100 |
| $K_2S_2O_8$ | 0.5 | 0.5 | — | — | — | — |
| "Vazo" | — | — | 0.5 | 0.5 | — | — |
| "PMHP" | — | — | — | — | 0.5 | 0.5 |
| "Dresinate" 214 (20% in water) | 22.5 | 45 | 22.5 | 45 | 22.5 | 45 |
| Water | 200 | 200 | 200 | 200 | 200 | 200 |
| Viscosity, cps | 121 | 94 | 71 | 48 | 50 | 49 |
| TSC % b.w. | 33.0 | 32.5 | 33.1 | 32.3 | 32.5 | 31.3 |

For the cord dip the phenolic resin used was prepared as follows:

| Ingredient | Parts By Weight |
|---|---|
| Resorcinol | 11 |
| Formaldehyde (37% in water) | 16.2 |
| 1 N NaOH | 7.5 |
| Deionized water | 23.1 |

After mixing, the resin composition was aged for 6 hours at 23 degrees C.

The adhesive used in the cord dip of this example was prepared as follows:

| Ingredient | Parts By Weight |
|---|---|
| Latex from Table 1 above (adjusted to 20% solids in water) | 100 |
| Aqueous $NH_4OH$ (28%) | 2 |
| Resin composition (after aging as above) | 55 |

The resulting adhesive dip (RFL) was then aged for over about 16 hours at room temperature (about 25 degrees C.) before it was used for cord dipping.

Two other latices were used to make RFL dips in which the polymer of one latex (latex X) was a chlorosulfonated polyethylene (low chlorine content, "Hypalon," duPont) and in which the polymer of the other latex (latex Y) was a terpolymer of 70 parts by weight of butadiene-1,3, 15 parts of styrene and 15 parts of 2-vinyl pyridine. The latices were adjusted to 20% solids and mixed with the resin composition as above, and the ratio of the rubber to the resin was the same as in the other dips.

The primed polyester and primed polyamide cords were passed through the aqueous RFL dips and dried in an oven.

The conditions for the oven drying (heat setting or curing) of the dip on the polyester cord were 45 seconds at 440 degrees F. (226.7 degrees C.) and for the oven drying of the dip on the polyamide cord were 90 seconds at 470 degrees F. (243.3 degrees C.).

After drying and cooling the dipped cords, they were combined according to the above H-adhesion test procedure with curable compounded EPDM rubber stocks (compositions) and cured in a mold for 30 minutes at 320 degrees F. (160 degrees C.) under 20 tons ram pressure.

The EPDM rubber stocks used had the following ingredients as shown in Table 2, below:

TABLE 2

EPDM Rubber Stocks

| | Parts By Weight | | | | |
|---|---|---|---|---|---|
| Ingredient | I | II | III | IV | V |
| "EPsyn" 55 | 100 | — | 100 | 100 | 100 |
| "EPsyn" 40A | — | 100 | — | — | — |
| HAF Carbon black | 100 | 100 | 100 | 100 | 100 |
| "Circosol" 2XH | 50 | 50 | 50 | 50 | 50 |
| Stearic Acid | 1.25 | 1.25 | 1.25 | 1.25 | 1.25 |
| Zinc Oxide | 5 | 5 | 5 | 5 | 5 |
| "NOBS" Special | 0.85 | 0.85 | — | — | — |
| DPG | 0.40 | 0.40 | — | — | — |
| MBT | — | — | 1.5 | 1.35 | 1.20 |
| "Vocol" S | — | — | 2.5 | 2.25 | 2.00 |
| Sulfur | 1.33 | 1.33 | 2.0 | 1.8 | 1.60 |

The H-adhesion results obtained on testing the above cords in the cured rubber stocks are shown in Table 3, below:

TABLE 3

| | | Cord H-adhesions in Pounds (Newtons) | | |
|---|---|---|---|---|
| | | EPDM | Latices | |
| Cord | Stock | A | B | C |
| Polyester | I | 31.6(141) | 29.2(130) | 37.2(165) |
| " | II | 36.4(162) | 43.5(193) | 40.9(182) |
| " | III | 46.7(208) | 41.6(185) | 52.0(231) |
| Polyamide | I | 33.2(148) | 36.6(163) | 44.7(199) |
| " | II | 39.0(173) | 43.2(192) | 35.8(159) |
| " | III | 44.0(196) | 48.7(217) | 49.6(221) |

| Cord | Stock | X | Y | |
|---|---|---|---|---|
| Polyester | I | 37.4(166) | 25.4(113) | |
| " | II | 37.5(167) | 23.8(106) | |
| " | III | 39.2(174) | 29.7(132) | |
| Polyamide | I | 26.8(174) | 30.6(136) | |
| " | II | 26.2(117) | 27.2(121) | |
| " | III | 30.4(135) | 32.0(142) | |

| Cord | Stock | D | E | F |
|---|---|---|---|---|
| Polyester | III | 43.5(193) | 47.2(210) | 41.9(186) |
| " | IV | 34.8(155) | 40.6(180) | 34.6(154) |
| " | V | 33.7(150) | 38.3(170) | 34.2(152) |
| Polyamide | III | 45.7(203) | 43.2(192) | 45.4(202) |
| " | IV | 40.9(192) | 40.4(179) | 40.0(178) |
| " | V | 38.3(170) | 39.3(175) | 39.8(177) |

| Cord | Stock | G | H | I | Y |
|---|---|---|---|---|---|
| Polyester | III | 43.3(192) | 43.3(192) | 49.4(219) | 26.6(118) |
| " | IV | 39.5(175) | 41.0(182) | 42.9(191) | 25.2(112) |
| " | V | 38.6(171) | 35.9(160) | 42.5(189) | 22.9(102) |
| Polyamide | III | 40.9(182) | 46.6(207) | 43.1(191) | 29.1(129) |
| " | IV | 37.9(168) | 40.0(178) | 39.7(176) | 30.4(135) |
| " | V | 39.0(173) | 37.5(167) | 38.0(169) | 29.2(130) |

Notes for Example:

"EPsyn" 55—EPDM rubber-Ethylene-propylene-ethylidene norbornene terpolymer. About 66.2 mole % of ethylene, relative unsaturation of 2.8, and nominal Mooney viscosity ML 1+4 at 125 degrees C. of 55. Copolymer Rubber & Chemical Corp.

"EPsyn" 40A—EPDM rubber. Ethylene-propylene-ethylidene norbornene terpolymer. About 67.4 mole % of ethylene, relative unsaturation of 1.3, and nominal Mooney viscosity ML 1+4 at 125 degrees C. of 40. Copolymer Rubber & Chemical Corp.

HAF Carbon black—High abrasion furnace carbon black.

"Circosol" 2XH—Rubber process and extender oil, naphthenic type. Sun Petroleum Products Co.

"NOBS" Special—N-Oxydiethylene benzothiazole-2-sulfenamide. American Cyanamid Company.

DPG—Diphenyl guanidine.

MBT—2-mercaptobenzothiazole.

"Vocol" S—62% zinc-O,O-di-butylphosphorodithioate on 38% inorganic carrier. Monsanto, Rubber Chemicals Div.

"Hylene" MP—Phenol blocked methylene-bis-(-4-phenyl isocyanate). duPont.

"Epon" 812—Mixture of branched di- and tri-epoxides made by the condensation of epichlorohydrin and glycerine. Epoxy functionality of 2.2 and contains about 10% by weight of tightly bound chlorine. Average mol. wt. of about 306. Epoxide equivalent of 140-160 (grams of resin containing one gram-equivalent of epoxide; α-epoxy group content; SMS 766 (ASTM D1652-59T)). Shell Chemical Co.

"Aerosol" OT—Dioctyl sodium sulfosuccinate. American Cyanamid Co.

NER-OIOA—Glycerol diglycidyl ether-Condensation product of epichlorohydrin and glycerine. Nagase & Co., Ltd.

"Sulfole" 120—t-dodecyl mercaptan. Phillips Petroleum, Rubber Chem. Div.

"Sipex" UB—Sodium lauryl sulfate. Alcolac, Inc.

"Dowfax" 2Al—Sodium dodecyl diphenyl ether disulfonate. Dow Chemical Co.

"Dresinate" 214—Potassium modified rosin acid. Hercules, Inc.

"VAZO"—Bis-azo-isobutyronitrile. duPont.

"PMHP"—55% paramenthane hydroperoxide. Hercules, Inc., Process Chemicals Div.

I claim:

1. A bonded composite material comprising a polyamide or polyester reinforcing element embedded in a vulcanized ethylene-propylene-non conjugated diene rubbery polymer (EPDM) compound, said element containing from about 3 to 17% by weight dry based on the weight of said element of a heat cured adhesive composition useful for adhering said element to said rubbery polymer compound consisting essentially of on a dry weight basis 100 parts by weight of a rubbery polybutadiene and a water-soluble thermosetting phenolic-aldehyde resin in an amount of from about 10 to 40 parts by weight.

2. A bonded composite material according to claim 1 where said resin is used in an amount of from about 12 to 30 parts by weight.

3. A bonded composite material according to claim 1 where said resin is a resorcinol-formaldehyde resin.

4. A bonded composite material according to claim 1 where said element is a primed element.

5. A bonded composite material according to claim 1 where said polyamide is an aromatic polyamide.

6. A bonded composite material according to claim 1 where said element contains about 3 to 7% by weight dry of said adhesive.

7. A method for adhering a polyamide or polyester reinforcing element to an ethylene-propylene-non conjugated diene rubbery polymer (EPDM) compound which comprises treating said element with an aqueous alkaline dispersion of about 10 to 35% by weight of solids consisting essentially of on a dry weight basis 100 parts by weight of a rubbery polybutadiene and a water-soluble thermosetting phenolic-aldehyde resin in an amount of from about 10 to 40 parts by weight, heating said treated element at a temperature of from about 300° to 525° F. for from about 150 to 25 seconds to remove essentially all of the water from said dispersion and to provide said element with a heat set adhesive in an amount of from about 3 to 17% by weight (dry) based on the weight of said reinforcing element, combining said dried and heat set adhesive containing reinforcing element with an unvulcanized vulcanizable ethylene-propylene-non conjugated diene rubbery polymer (EPDM) compound and vulcanizing the same.

8. A method according to claim 7 where said resin is used in an amount of from about 12 to 30 parts by weight.

9. A method according to claim 7 where said resin is a resorcinol-formaldehyde resin.

10. A method according to claim 7 where said element is a primed element.

11. A method according to claim 7 where said polyamide is an aromatic polyamide.

12. A method according to claim 7 where said element contains about 3 to 7% by weight dry of said adhesive.

* * * * *